(12) United States Patent
Han et al.

(10) Patent No.: US 10,922,258 B2
(45) Date of Patent: Feb. 16, 2021

(54) CENTRALIZED-DISTRIBUTED MIXED ORGANIZATION OF SHARED MEMORY FOR NEURAL NETWORK PROCESSING

(71) Applicant: ALIBABA GROUP HOLDING LIMITED, Grand Cayman (KY)

(72) Inventors: Liang Han, San Mateo, CA (US);
Xiaowei Jiang, San Mateo, CA (US);
Jian Chen, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 43 days.

(21) Appl. No.: 16/201,904

(22) Filed: Nov. 27, 2018

(65) Prior Publication Data

US 2019/0197001 A1   Jun. 27, 2019

Related U.S. Application Data

(60) Provisional application No. 62/610,098, filed on Dec. 22, 2017.

(51) Int. Cl.
*G06F 13/40* (2006.01)
*G06F 3/06* (2006.01)
(Continued)

(52) U.S. Cl.
CPC ........ *G06F 13/4027* (2013.01); *G06F 3/0604* (2013.01); *G06F 3/0659* (2013.01);
(Continued)

(58) Field of Classification Search
CPC .... G06F 3/0604; G06F 3/0659; G06F 3/0673; G06F 13/28; G06F 13/4027;
(Continued)

(56) References Cited

U.S. PATENT DOCUMENTS 5,581,777 A * 12/1996 Kim .................... G06F 11/1044
711/154
7,581,055 B2   8/2009 Jeddeloh
(Continued)

FOREIGN PATENT DOCUMENTS

GB         2417105 A      2/2006

OTHER PUBLICATIONS

Protic et al., "Distributed Shared Memory: Concepts and Systems," University of Belgrade, IEEE Parallel & Distributed Technology 1063-6552/96 © 1996 IEEE, (pp. 1-17).
(Continued)

*Primary Examiner* — Eric T Oberly
(74) *Attorney, Agent, or Firm* — Finnegan, Henderson, Farabow, Garrett & Dunner, LLP

(57) ABSTRACT

The present disclosure provides a processor providing a memory architecture having M-number of processing elements each having at least N-number of processing units and a local memory. The processor comprises a first processing element of the M-number of processing elements comprising a first set of N-number of processing units configured to perform a computing operation, and a first local memory configured to store data utilized by the N-number of processing units. The processor further comprises a data hub configured to receive data from the M-number of processing elements and to provide shared data to each processing element of the M-number of processing elements.

22 Claims, 11 Drawing Sheets

(51) Int. Cl.
*G06N 3/08* (2006.01)
*G06F 13/28* (2006.01)
*G06F 13/42* (2006.01)

(52) U.S. Cl.
CPC ............. *G06F 3/0673* (2013.01); *G06N 3/08* (2013.01); *G06F 13/28* (2013.01); *G06F 13/4282* (2013.01); *G06F 2213/0026* (2013.01); *G06F 2213/28* (2013.01)

(58) Field of Classification Search
CPC ......... G06F 13/4282; G06F 2213/0026; G06F 2213/28; G06N 3/08
See application file for complete search history.

(56) References Cited

U.S. PATENT DOCUMENTS

| | | | | |
|---|---|---|---|---|
| 8,316,220 | B2* | 11/2012 | Iwamoto | G06F 9/3865 712/244 |
| 2005/0010743 | A1* | 1/2005 | Tremblay | G06F 9/3001 712/10 |
| 2009/0300621 | A1* | 12/2009 | Mantor | G06F 9/30087 718/100 |
| 2012/0017062 | A1 | 1/2012 | Goel et al. | |
| 2015/0052333 | A1* | 2/2015 | Hughes | G06F 9/30018 712/208 |
| 2015/0113092 | A1 | 4/2015 | Chadha et al. | |
| 2016/0275309 | A1 | 9/2016 | Austin et al. | |
| 2017/0103302 | A1 | 4/2017 | Henry et al. | |
| 2017/0109281 | A1 | 4/2017 | Weissmann et al. | |

OTHER PUBLICATIONS

Zhang, et al., "Optimizing Compiler for Shared-Memory Multiple SIMD Architecture," Proceedings of the 2006 ACM SIGPLAN/SIGBED conference on Language compilers, and tool support for embedded systems, ISBN:1-59593-362-x, Jul. 7, 2006 (pp. 1-10).
Notification of Transmittal of the International Search Report and the Written Opinion of the International Searching Authority issued in corresponding International Application No. PCT/US2018/067241, dated Mar. 15, 2019.

* cited by examiner

CENTRALIZED-DISTRIBUTED MIXED ORGANIZATION OF SHARED MEMORY FOR NEURAL NETWORK PROCESSING

CROSS-REFERENCE TO RELATED APPLICATIONS

This application is based upon and claims priority to U.S. Provisional Application No. 62/610,098, filed Dec. 22, 2017, and entitled "A Centralized-Distributed Mixed Organization of Shared Memory for Neural Network Processing," the entire contents thereof are incorporated herein by reference.

BACKGROUND

Deep neural network algorithms involve a large number of matrix calculations, which generally leads to a hardware architecture involving very wide single-instruction multiple-data (SIMD) processing units and large on-chip storage. Due to the nature of deep learning, different SIMD lanes need to exchange data from time to time. A number of memory architectures exist that provide cross-lane data processing and computing, but these architectures are deficient for several reasons, such as unacceptable increases in memory access latency, in bank-conflict issues, in performance issues, etc.

SUMMARY

The present disclosure provides a processor providing a memory architecture providing a memory architecture having M-number of processing elements each having at least N-number of processing units and a local memory. The processor comprises a first processing element of the M-number of processing elements comprising a first set of N-number of processing units configured to perform a computing operation, and a first local memory configured to store data utilized by the N-number of processing units. The processor further comprises a data hub configured to receive data from the M-number of processing elements and to provide shared data to each processing element of the M-number of processing elements.

The present disclosure provides a method performed by a centralized data hub capable of communicating with M-number of processing elements each having at least N-number of processing units and a local memory. The method comprises acquiring data from a processing element of M-number of processing elements; determining a distribution pattern for the acquired data; and distributing the acquired data to at least one or more of the M-number of processing elements using the distribution pattern.

The present disclosure provides a method performed by a processing element of multiple processing elements coupled to a centralized data hub. The method comprises acquiring shared data from the centralized data hub; acquiring private data local to the processing element; storing the private data in a local memory of the of the processing element; providing the shared data and the stored private data as operands to one or more processing units of the processing element; and generating one or more results from one or more operations performed by corresponding one or more processing units.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
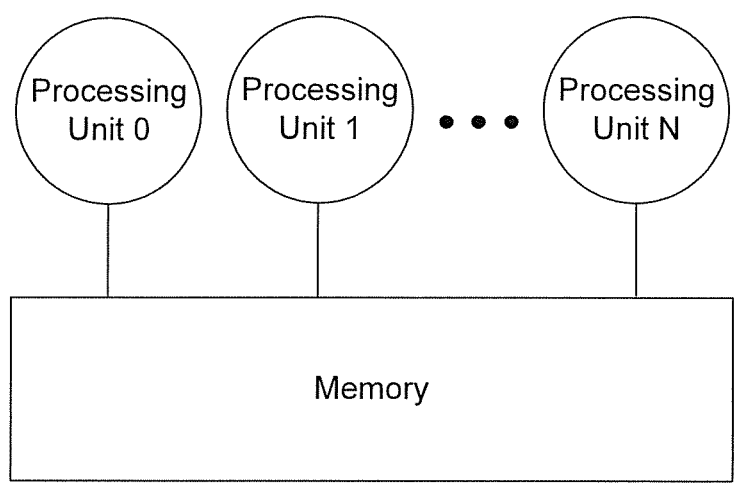
FIG. 1 is a schematic diagram illustrating an exemplary centralized shared memory storing data to be exchanged between SIMD lanes.

Reference is made to FIG. 1, which is a schematic diagram illustrating an exemplary centralized shared memory storing data to be exchanged between SIMD lanes. The centralized-shared memory architecture includes multiple processing units (e.g., processing unit 0, processing unit 1, processing unit N shown in FIG. 1) and a memory block.

These processing units can be configured to provide the same or different functionality and to connect to a same memory block (e.g., memory in FIG. 1). Each processing unit is connected to a storage blocks of the memory by a SIMD lane. The memory block includes multiple storage blocks that are electrically connected. Data exchange between SIMD lanes are achieved by data exchange between storage blocks of the memory. Data can be requested by any processing units connecting to the memory, and data can be sent to the requesting processing unit.

But the centralized shared memory architecture is not scalable. As each SIMD lane is electrically connected to a processing unit and some storage block in a memory, when the number of SIMD lanes increase, the size of memory increases at a faster speed because the memory is centralized in the way that the main route to access storage blocks are shared by different data access requests. When different processes access different storage blocks along the main route, bank conflict can occur. The route to access storage blocks can only allow one process to access one storage block at one time, and another process to access another storage block at another time. In other words, access to storage blocks are prioritized and linearized. Two accesses cannot happen simultaneously. Accordingly, bank conflict issue becomes more serious along with the increase of numbers of SIMD lanes. The bank conflict issue quickly results in increased memory-access latency to the level unacceptable for a typical neural network computing application.

Figure 2:
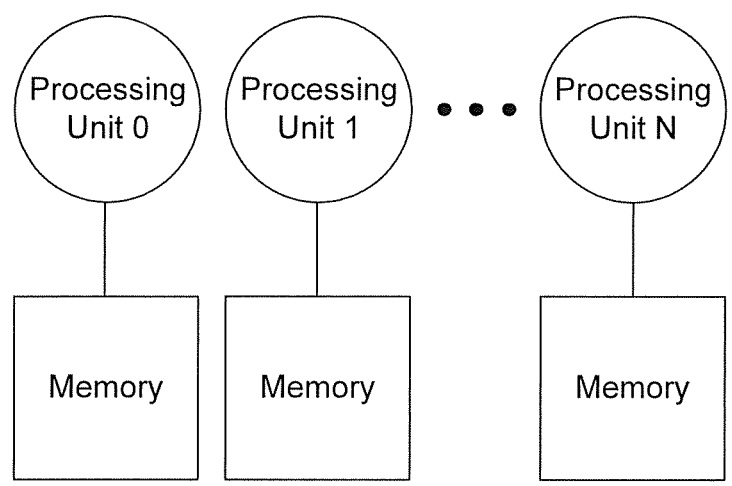
FIG. 2 is a schematic diagram illustrating an exemplary distributed shared memory storing data to be exchanged between SIMD lanes.

Reference is now made to FIG. 2, which is a schematic diagram illustrating an exemplary distributed shared memory (DSM) storing data to be exchanged between SIMD lanes. In the DSM architecture, there are multiple processing units and multiple memory blocks. Each processing unit is associated and electrically connected with a memory block. The shared memory blocks are globally addressed by an address but are distributed into multiple compute nodes. Each computer node is configured to include a memory manager to access remote data.

By arranging computer nodes in a distributed way, DSM scales better than centralized memory, because the architecture avoids the bank conflict issue caused by simultaneous access demands. When compared to non-distributed shared-memory architecture, however, the DSM architecture has slower access to data. This is especially true when processing lanes increase to a larger number, thereby leading to issues with exchanging data across computing nodes. The slow access to data is primarily caused by exchanging data across computing nodes in DSM architecture. Often time, an access to remote data may need to involve multiple computing nodes, which notably delays the access.

Figure 3:
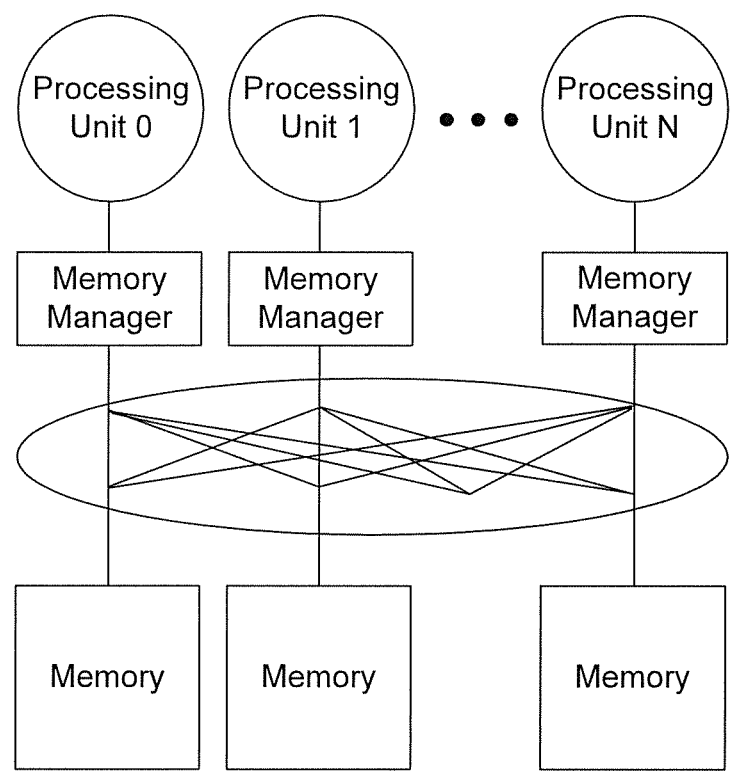
FIG. 3 is a schematic diagram illustrating an exemplary implementation of a distributed shared memory using point to point cross-bar.

Currently, DSM architectures exchange data in a couple different ways. For example, as shown in FIG. 3, there is a point to point cross-bar to connect all distributed memory, allowing each processing unit to access memory on each of distributed nodes. This is implemented by coupling each memory manager of a node to each memory block, thereby enabling the processing unit associated with the memory manager to access each memory block through its own dedicated access route. However, the cost of the cross bar increases very fast—exponentially with the number of computing nodes. That is, the cost of an eight-to-eight cross-bar can be more than 4 times of that of a 4-to-4 cross bar.

Figure 4A:
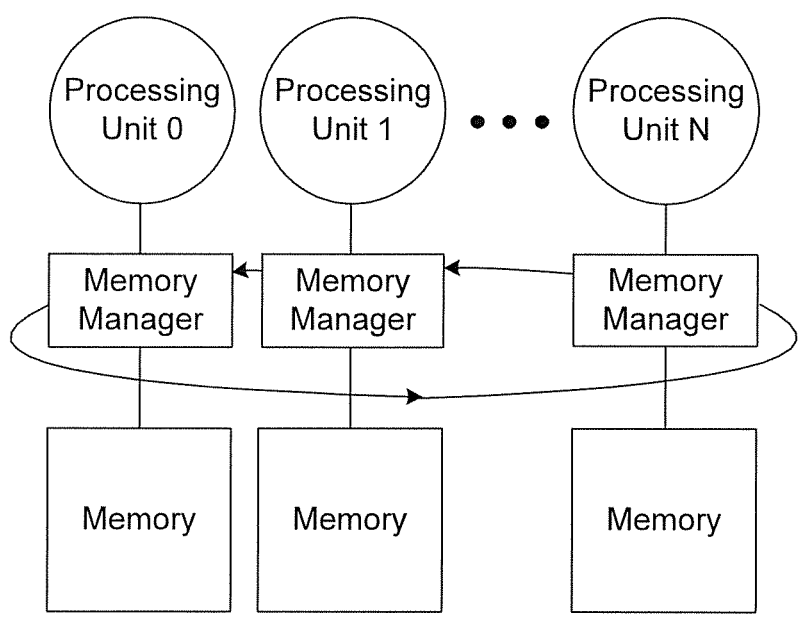
FIG. 4A is a schematic diagram illustrating an exemplary implementation of a distributed shared memory architecture with data sharing via a shifting connection method.

FIG. 4A illustrates another DSM architecture for data exchanging and sharing between SIMD lanes. Each node connects to its left and right neighbors only. To reach a remote node, the data would need multiple hops to reach the intended destination. Thus, this architecture suffers from performance issues, as the data transfer performance is not comparable to the cross-bar method.

Figure 4B:
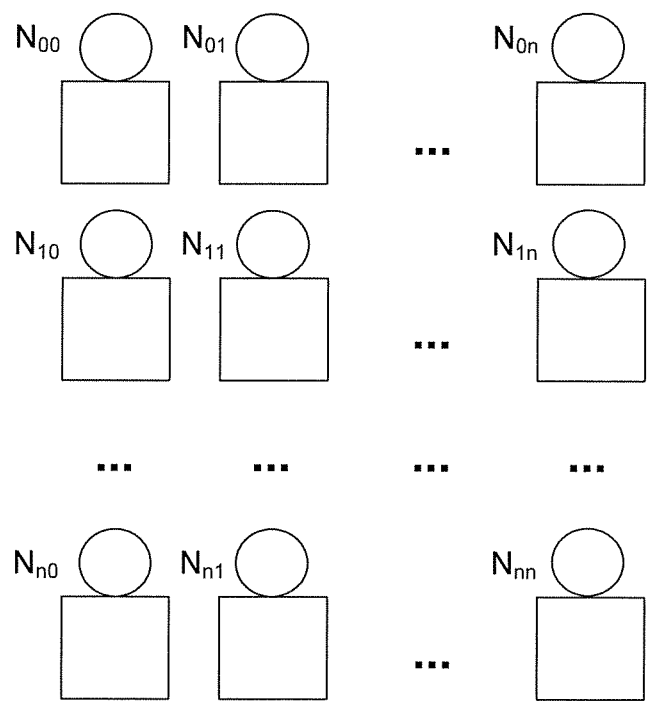
FIG. 4B is a schematic diagram illustrating an exemplary implementation of a distributed memory architecture with data sharing via a two-dimensional mesh connection method.

A more complicated connection can involve a 2D mesh (as shown in FIG. 4B) or a 3D topology. In a 2D mesh, computing nodes are organized as a 2D array, and each node communicates with its left, right, top, and bottom neighbors. For a 3D topology (like 3D Torus or Hyper Cube), each computing node can communicate with 6 neighbors. These architectures generally need to introduce a router in each node to determine where an incoming data packet should be forwarded to since there are multiple possible directions to go. The routing scheme is very complicated, which can lead to deadlock if the scheme is not designed carefully. Thus, such organizations are generally used for coarse grained data sharing with rare remote data access.

The embodiments of the present disclosure use a layered-mixed architecture to take advantage of both centralized and DSM architectures and to overcome the shortcomings of both. The disclosed embodiments also use a smart data hub to efficiently and quickly exchange data among distributed shared memory with low cost.

Figure 5:
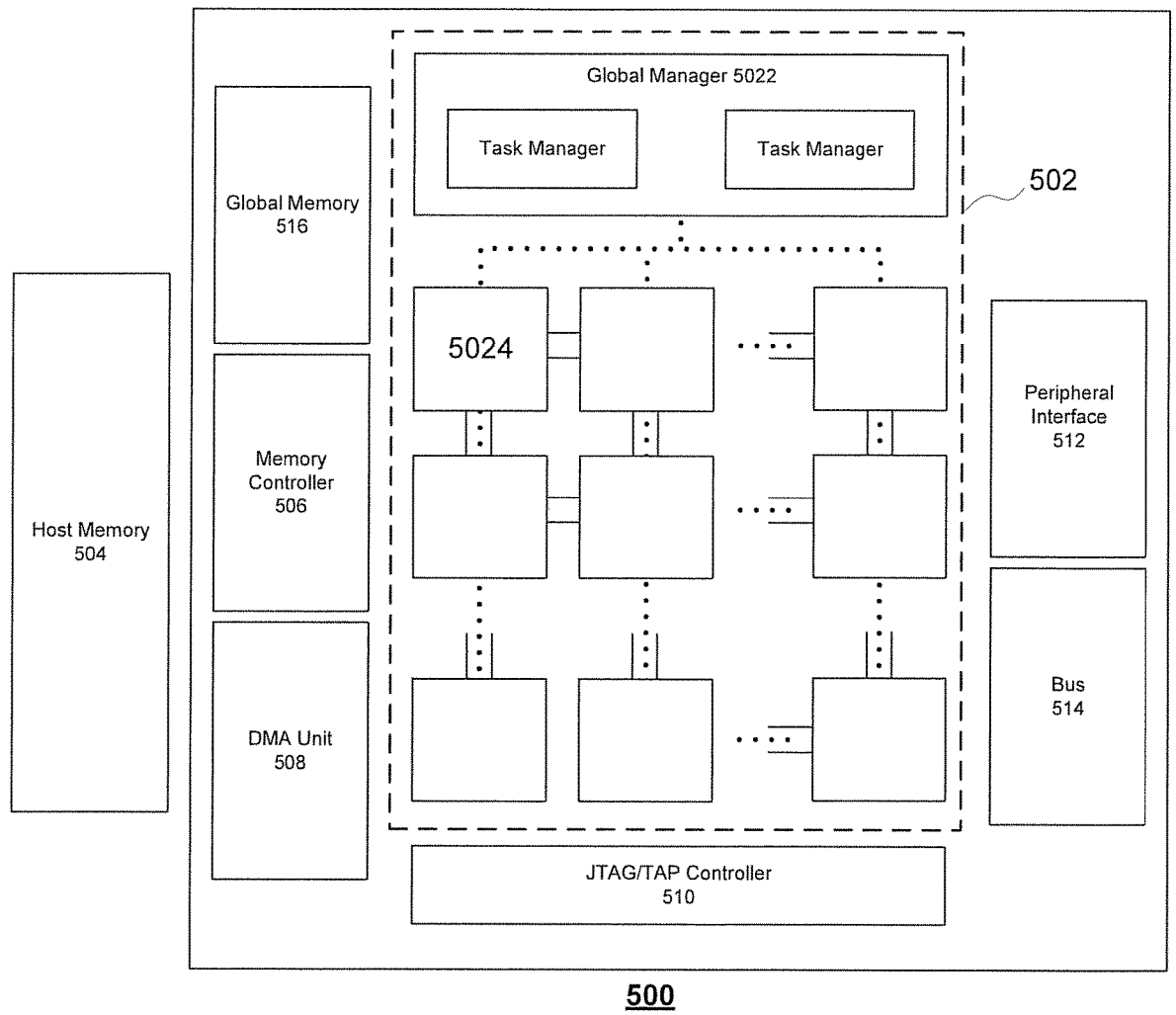
FIG. 5 is a schematic diagram illustrating an exemplary neural network processing unit (NPU) chip, consistent with embodiments of the present disclosure.

FIG. 5 illustrates an exemplary neural network processing unit (NPU) architecture 500, according to embodiments of the disclosure. As shown in FIG. 5, NPU architecture 500 can include an on-chip communication system 502, a host memory 504, a memory controller 506, a direct memory access (DMA) unit 508, a Joint Test Action Group (JTAG)/Test Access End (TAP) controller 510, peripheral interface 512, a bus 514, a global memory 516, and the like. It is appreciated that on-chip communication system 502 can perform algorithmic operations based on communicated data. Moreover, NPU architecture 500 can include a global memory 516 having on-chip memory blocks (e.g., 4 blocks of 8 GB second generation of high bandwidth memory (HBM2)) to serve as main memory.

Chip communication system 502 can include a global manager 5022 and a plurality of cores 5024. Global manager 5022 can include at least one task manager to coordinate with one or more cores 5024. Each task manager can be associated with an array of cores 5024 that provide synapse/neuron circuitry for the neural network. For example, the top layer of processing elements of FIG. 5 may provide circuitry representing an input layer to neural network, while the second layer of tiles may provide circuitry representing a hidden layer of the neural network. As shown in FIG. 5, global manager 5022 can include two task managers to coordinate with two arrays of cores 5024.

Cores 5024 can include one or more processing elements that each include single instruction, multiple data (SIMD) architecture including one or more processing units configured to perform one or more operations (e.g., multiplication, addition, multiply-accumulate, etc.) on the communicated data under the control of global manager 5022. To perform the operation on the communicated data packets, cores 5024 can include one or more processing elements for processing information in the data packets. Each processing element may comprise any number of processing units. In some embodiments, core 5024 can be considered a tile or the like Host memory 504 can be off-chip memory such as a host CPU's memory. For example, host memory 504 can be a DDR memory (e.g., DDR SDRAM) or the like. Host memory 504 can be configured to store a large amount of data with slower access speed, compared to the on-chip memory integrated within one or more processors, acting as a higher-level cache.

Memory controller 506 can manage the reading and writing of data to and from a specific memory block (e.g., HBM2) within global memory 516. For example, memory controller 506 can manage read/write data coming from outside chip communication system 502 (e.g., from DMA unit 508 or a DMA unit corresponding with another NPU) or from inside chip communication system 502 (e.g., from a local memory in core 5024 via a 2D mesh controlled by a task manager of global manager 5022). Moreover, while one memory controller is shown in FIG. 5, it is appreciated that more than one memory controller can be provided in NPU architecture 500. For example, there can be one memory controller for each memory block (e.g., HBM2) within global memory 516.

Memory controller 506 can generate memory addresses and initiate memory read or write cycles. Memory controller 506 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 508 can assist with transferring data between host memory 504 and global memory 516. In addition, DMA unit 508 can assist with transferring data between multiple NPUs (e.g., NPU 500). DMA unit 508 can allow off-chip devices to access both on-chip and off-chip memory without causing a CPU interrupt. Thus, DMA unit 508 can also generate memory addresses and initiate memory read or write cycles. DMA unit 508 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that NPU architecture 500 can include a second DMA unit, which can be used to transfer data between other NPU architecture to allow multiple NPU architectures to communication directly without involving the host CPU.

JTAG/TAP controller 510 can specify a dedicated debug port implementing a serial communications interface (e.g., a JTAG interface) for low-overhead access to the NPU without requiring direct external access to the system address and data buses. JTAG/TAP controller 510 can also have on-chip test access interface (e.g., a TAP interface) that implements a protocol to access a set of test registers that present chip logic levels and device capabilities of various parts.

Peripheral interface 512 (such as a PCIe interface), if present, serves as an (and typically the) inter-chip bus, providing communication between the NPU and other devices.

Bus 514 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a peripheral interface 512 (e.g., the inter-chip bus), bus 514 is solely concerned with intra-chip buses, though in some implementations it could still be concerned with specialized inter-bus communications.

While NPU architecture 500 of FIG. 5 incorporates the embodiments of the present disclosure, it is appreciated that the disclosed embodiments can be applied to chips with SIMD architecture for accelerating some applications such as deep learning. Such chips can be, for example, GPU, CPU with vector processing ability, or neural network accelerators for deep learning. SIMD or vector architecture is commonly used to support computing devices with data parallelism, such as graphics processing and deep learning. The SIMD architecture can include multiple processing elements, wherein each of the processing elements can perform the same operation on multiple data points simultaneously.

In some embodiments, neural network processors comprise a compiler (not shown). The compiler is a program or computer software that transforms computer code written in one programming language into NPU instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof.

Figure 6:
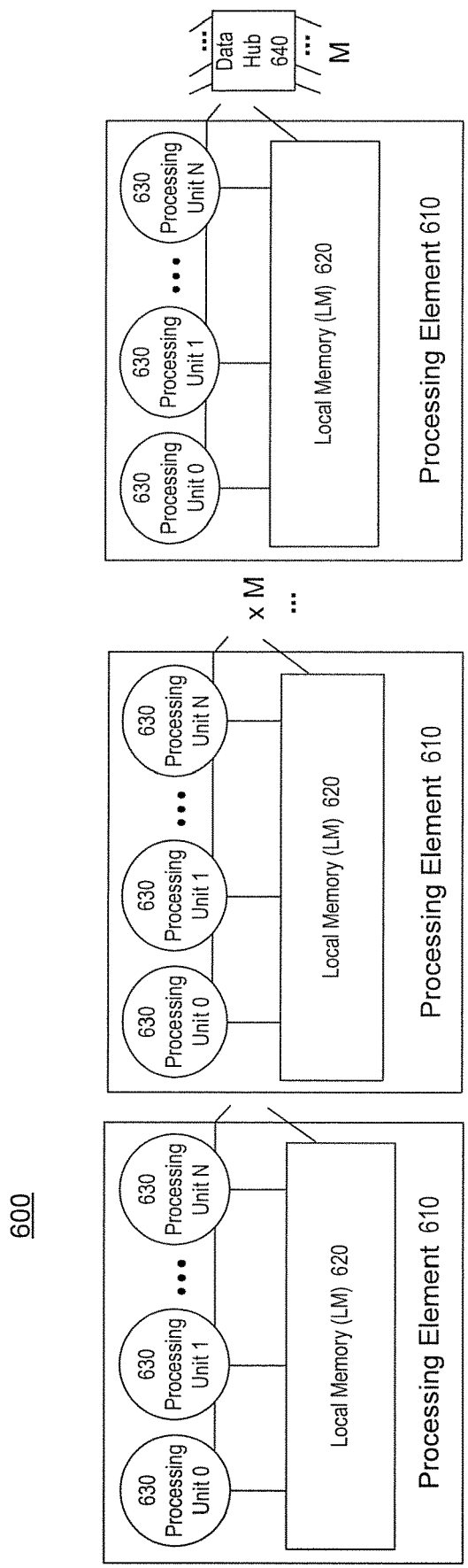
FIG. 6 is a schematic diagram illustrating an exemplary implementation of 2-layer data-sharing architecture, consistent with embodiments of the present disclosure.

FIG. 6 illustrates an exemplary implementation of a two-layer data-sharing architecture 600, consistent with embodiments of the present disclosure. The two-layer data-sharing architecture 600 includes a data hub 640 with 2M data lines (e.g., M input data lines and M output data lines) and M processing elements 610. Each processing element 610 includes N processing units 630 and a local memory 620 that is a centralized shared memory shared by N processing units 630 of that processing element.

In some embodiments, each processing element 610 provides a shared memory architecture with each processing unit 630 therein being electrically coupled to neighboring processing units and ultimately electrically connected to data hub 640. In this configuration, data exchanges can happen (1) between SIMD lanes within the same processing element by exchanging data between storage blocks of local memory 620 and (2) between processing elements 610 via data hub 640. Regarding the latter, each local memory 620 is electrically coupled to data hub 640 and can send data to data hub 640 through its corresponding one of the M input data lines. Each processing unit 630 is also electrically coupled to data hub 640 and can receive output data from data hub 640 through a corresponding one of the M output data lines.

Figure 7:
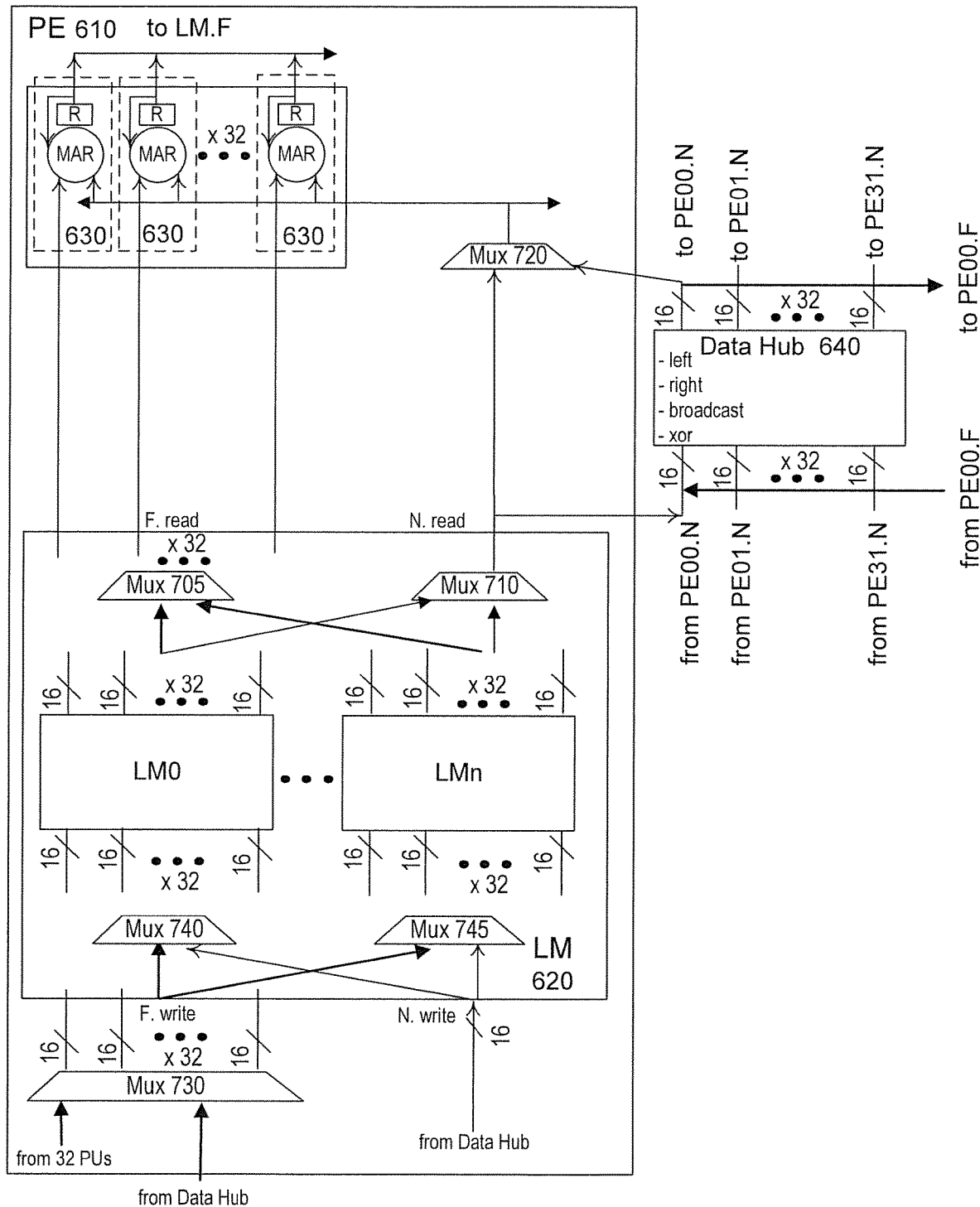
FIG. 7 is a schematic diagram illustrating an exemplary connection method utilized by the exemplary 2-layer data-sharing architecture of FIG. 6 with a data hub, consistent with embodiments of the present disclosure.

FIG. 7 illustrates an exemplary processing element and data hub utilized by the exemplary two-layer data-sharing architecture of FIG. 6, consistent with embodiments of the present disclosure. For illustrative purposes, in the embodiments shown in FIGS. 6-7, the value of M and N are equal to 32 and the data width is equal to 16 bits, but it is appreciated that any reasonable values of M and the data width can be used that are consistent with the disclosed embodiments. In implementations, however, M may be greater than or equal to N. While larger values of M and N are preferred for larger design, the maximum values of M and N may be limited by place-and-route during integrated circuits, which in turn depends on chip manufacturing technology.

For example, as shown in FIG. 7, at the lower processing-element layer, the exemplary disclosed embodiments organize N processing units (e.g., such as a multiplier accumulator reducer (MAR) shown in FIG. 7) into one processing element, which uses a centralized shared memory (referred to as local memory (LM) 620) for these 32 processing units for data sharing. And, at the top data-hub layer shown in FIG. 6 (the level of a data hub with multiple processing elements), processing elements 610 are connected together into a system via data hub 640, where the local memory of each processing element forms a distributed shared memory architecture. These local memories are globally addressed and are electrically connected via data hub 640, which provides the ability for fast sharing.

Each local memory 620 can include full ports (e.g., left two ports of local memory 620 in FIG. 7, which are associated with F.write and F.read ports involving 32 connections having 16 bits—one connection for each processing unit of the processing element) providing processing units 630 parallel access to local memory 620. Full ports can be used for SIMD access to private data, such as weights of a fully connected layer in a neural network. It is appreciated that local data stored in local memory 620 and shared directly with processing units 630 associated with the same local memory is treated as private data. Each local memory 620 can also include narrow ports (e.g., the right two ports of local memory 620 in FIG. 7, which are associated with N.write and N.read ports involving 1 connection having 16 bits) providing processing units 630 narrow access to the memory. Narrow ports can be used for broadcasting or broadcasted shared data. It is appreciated that remote data stored in another local memory and shared with all processing units 630 of all LMs is treated as shared data.

Full ports and narrow ports are configured to associate with different storage blocks in local memory 620. These multiple storage blocks (e.g., storage blocks LM0 to LMn, each of which can be SRAM) in local memory 620 are physically connected to all full and narrow ports via multiplexers (e.g., multiplexers 705, 710, 740, and 745) and can provide concurrent access to and from these ports. For instance, with respect to the read ports, there is one multiplexer for each port (e.g. multiplexer 705 for the F.read port and multiplexer 710 for the N.read port) and both are connected to each of storage blocks. Accordingly, multiplexers 705 and 710 may both be n-to-1 ports where n is the number of storage blocks in local memory. It is appreciated that one or more other multiplexers may exist between storage block and multiplexer 710. For example, in situations where there are 32 16-bit outputs, a 32-to-1 multiplexer may select one of the 32 inputs to provide to the N.read port.

With respect to the write ports, each storage block has one or more corresponding 2-to-1 multiplexers that select inputs received from both F.write and N.write ports. For example, in situations where data is being written to a memory block, there may be 32 2-to-1 multiplexers (one for each of the 32 16-bit inputs) that selects one 16-bit inputs received from either the F.write or N.write ports. The configuration of these connections between storage blocks LM0-LMn and the ports can be established based on instructions received by core 5024.

For instance, a sequence of SIMD instructions running in one or more cores may involve all 32 processing units 630 of each of the 32 processing element 610 to perform the calculation of Aout[1024]=W[1024]*Ain[1]. In this example, storage blocks LM0-LM3 are used to store data with LM0 storing private data and LM1 storing shared data received via a back-staged control sequence. Each of the 32 processing elements can perform the calculation in parallel:

1) Weight values W[0:32] (which is private data to each processing unit 630) are read out as 16 bits over 32 connections from storage block LM0 via multiplexer 705 and F.read port;
2) Input value Ain (which is shared among all 32 processing elements 630) is read out from storage block LM1 via multiplexer 710 and N.read port;
3) After the 32 processing units 630 perform the W[i]*Ain calculation, the 32 results are stored back into local memory 620 (e.g., in storage block LM2) in parallel via F.write port and a 2-1 multiplexer corresponding to LM2;
4) Moreover, shared data associated with back-staged data installment (e.g., via data hub) can be stored to LM3 via a corresponding 2-1 multiplexer.

The design of each storage block LM0-LM3 can be implemented using one-Read/Write port (with each storage block of SRAM can serve either as one READ storage block or one Write storage block that cycle) instead of one-Read/one-Write port SRAM (can serve one READ and one WRITE), leading to ~30% silicon area reduction. In this example, storage block LM0-LM3 have identical functionality and can be configured based on software. That is, any type of data (whether it be private or shared) can be stored in any storage block as long as it satisfies that there are only one data flow through one dedicated storage block via one port at any given moment—although all storage blocks are physically connected to all ports—so as to avoid data conflict. Moreover, it is appreciated that other storage blocks may exist and may be idle depending on the clock cycle.

Moreover, in some embodiments, private data stored in storage blocks (e.g., private data stored in LM0) can be shared with other local memories when that private data is pushed to narrow port N.read (via multiplexer 710). Thereafter, data at narrow port N.read is sent to data hub 640 and changes to shared data for further use by other processing units of other processing elements. In some embodiments, based on the configuration of the storage blocks, data circulated via data hub 640 can be stored as private data for later use. In combination, both private and shared data are stored in a uniformed organization of local memory. And private and shared data are sent to corresponding destinations (processing units or data hub) by corresponding ports (full ports or narrow ports).

Moreover, the disclosed embodiments provide an efficient design of a data hub. Given that the majority of shared data are accessed under a broadcasting mode, it is appreciated that the disclosed embodiments do not have to introduce a full cross-bar (e.g., 1024-to-1024×16-bits), which would consume a large amount of hardware resources for data sharing. Instead, the disclosed embodiments provide a low-cost but efficient enough way as described below.

As FIG. 7 shows, each of the 32 inputs of data hub 640 is connected with the narrow read port (N.read) of each processing element 610. In total, there are 32 inputs from narrow read ports of the 32 processing elements. The 32 outputs of data hub 640 are connected to a multiplexer 720 of each processing element 610. This gives data hub 640 the ability to gather 32 data inputs (one from each of the processing elements), and to forward the inputs to any one of the 32 processing elements. It is appreciated that the forwarded 32 processing elements can be different from the 32 processing elements where input data comes from. That is, a second set of processing elements that is different from the set of processing elements of FIG. 6 can provide input data to data hub 640.

Data hub 640 can be configured to provide a swizzling function, which will be further described below. In this way, each processing element can feed shared data from another processing element into the processing units (e.g., MARs). It is appreciated that all processing elements can perform the same operation in parallel for the SIMD applications.

Moreover, the 32 16-bit data outputs of data hub 640 are connected to the full write port (F.write) of a local memory of a processing element (which also can receive the outputs of the local processing units). This configuration allows the data hub the ability to gather 32 data inputs, one from each of the processing elements, and push them to one selected processing element of FIG. 7, so that it can perform reduction operations for the whole group of processing elements afterwards.

Similarly, data hub 640 can read 32 16-bit data inputs from the processing element's full read port (F.read) and forward them to 32 processing elements in parallel. 32 16-bit data are sent out from the processing element's full read port and sent into input data lines of data hub 640. The 32 16-bit data can be forwarded to some selected or all of the 32 processing elements at the same time via multiplexer 720. Accordingly, data hub 640 is enabled to circulate (or scatter) the previously gathered and processed data from the 32 processing elements for more following parallel computing operations.

Figure 8:
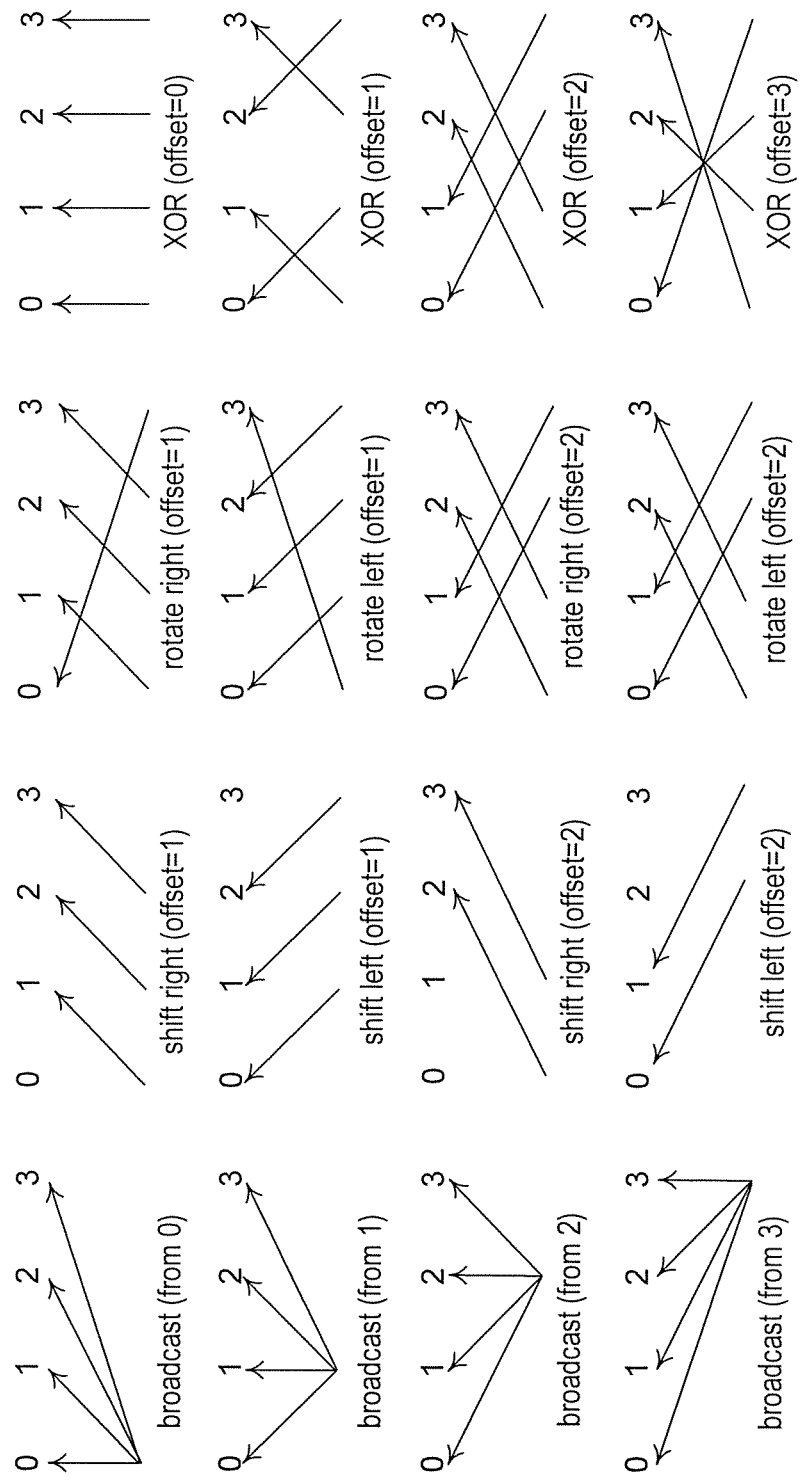
FIG. 8 illustrates exemplary swizzle functions provided by the exemplary data hub of FIG. 7, consistent with embodiments of the present disclosure.

Furthermore, data hub 640 can provide a swizzle function. The swizzle function provides the ability to reshuffle data between input data lines and output data lines. Through the swizzle function, the data from one processing element received by data hub 640 can be provided to another processing element of the multiple processing elements associated with data hub 640. Instead of a fully connected cross-bar configuration, data hub 640 may selectively support a few major patterns to efficiently exchange shared data in parallel between processing elements. These patterns include broadcasting, butterfly (XOR), shift right/left, and rotate right/left, as shown in FIG. 8, which has been simplified to illustrate four-to-four connections. This swizzle function provides the ability to efficiently and quickly exchange data across the memory architecture at a low cost of hardware resource.

In some embodiments, as shown in the first column of FIG. 8, data hub 640 can utilize a broadcasting pattern of the swizzle function to broadcast data from processing element 0, 1, 2, or 3 to all 4 processing elements. In some embodiments, the swizzle function can provide a shifting pattern, as shown in the second column of FIG. 8, in which data can be shifted left or right with different offsets (e.g. 1, 2, etc.). In some embodiments, the swizzle function can provide a rotating pattern, as shown in the third column of FIG. 8, in which data can be rotated left or right with different offsets (e.g., 1, 2, etc.). In some embodiments, the swizzle function can provide an XOR pattern, as shown in the fourth column of FIG. 8, in which data can be operated in an XOR operation with different offsets as well (e.g., 1, 2, 3, etc.). The swizzle pattern of data hub 640 can be designed differently under the same principle, to receive data from and send data to corresponding processing elements based on the designed swizzle pattern. Accordingly, it is appreciated that other swizzle patterns may exist for distributing data across the processing elements.

Figure 9:
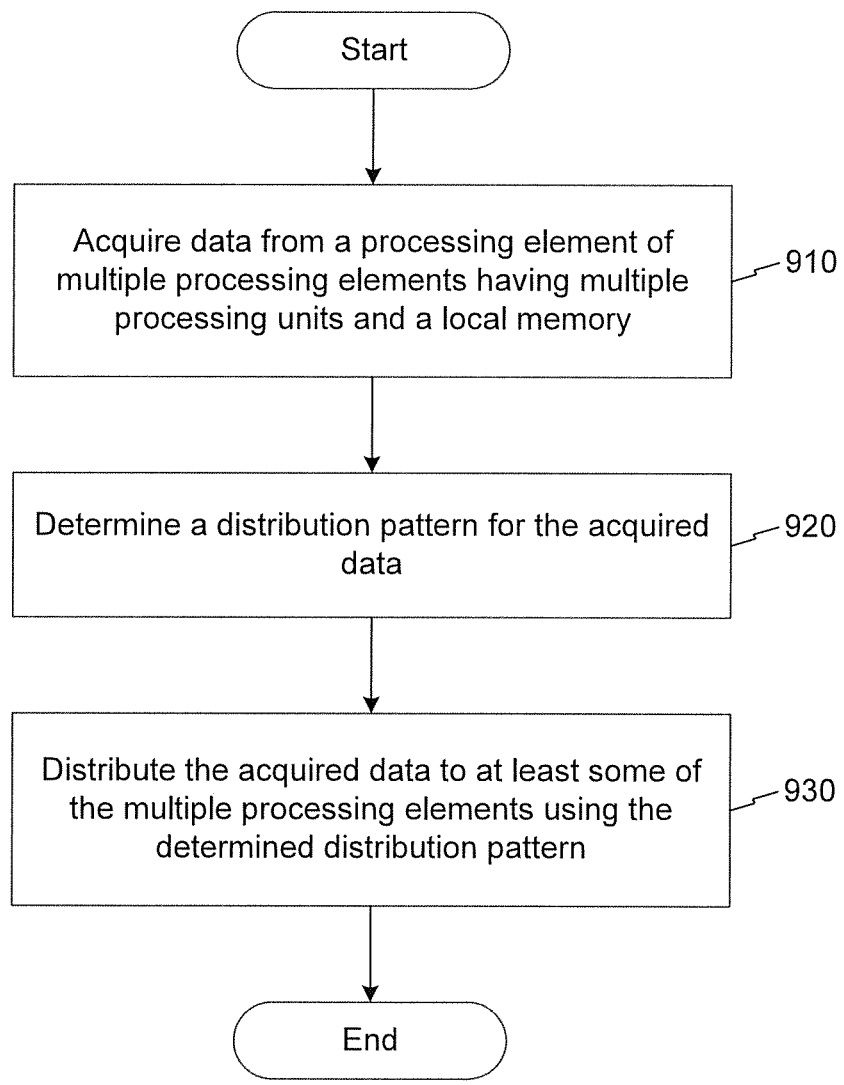
FIG. 9 illustrates a flow diagram of an exemplary method for distributing data from a centralized data hub, consistent with embodiments of the present disclosure.

FIG. 9 illustrates a flow diagram of an exemplary method 900 for distributing data from a centralized data hub, consistent with embodiments of the present disclosure. Method 900 can be performed by a centralized data hub (e.g., data hub 640). The centralized data hub can receive instructions from a task manager based on commands from a host CPU. The centralized data hub can communicate with multiple processing elements (e.g., M processing elements 610 of FIG. 6), wherein each processing element can have multiple processing units (e.g., N processing units 610 of FIG. 6).

In step 910, the centralized data hub acquires data from a processing element (e.g., processing element 610 of FIG. 7) of multiple processing elements having multiple processing units (e.g., processing unit 630) and a local memory (e.g., local memory 620). In some embodiments, the centralized data hub can acquire the data from a local memory of the processing element. For example, the data can be acquired via a multiplexer of the processing element (e.g., multiplexer 710 associated with the narrow-read port of local memory 620 of FIG. 7).

In step 920, the centralized data hub determines a distribution pattern for the acquired data. The determination can be made directly by the centralized data hub or indirectly based on information received by the centralized data hub. For example, as shown in FIG. 7, data hub 640 can receive a distribution indication (e.g., left for left shifting, right for right shifting, broadcast, and XOR). This distribution indication can be from a task manager (e.g., task manager of global manager 5022), instructing data hub 640 how to distribute the acquired information.

The distribution pattern can be any type of pattern for distributing data. For example, as shown above in FIG. 8, the distribution pattern can include broadcasting, left or right shifting, left or right rotating, or XORing. Moreover, the distribution pattern can provide any offset data.

In step 930, the centralized data hub distributes the acquired data to at least some of the multiple processing elements using the determined distribution pattern. Using the distribution pattern, the centralized data hub distributes the acquired data to the processing units or to the local memory of processing elements. For example, as shown in FIG. 7, data hub 640 can provide data to local memory 620 via the full- or narrow-write ports connected to multiplexers 740 and 745, or to one or more processing units 630 via multiplexer 720. After the data is distributed, the method can end.

Figure 10:
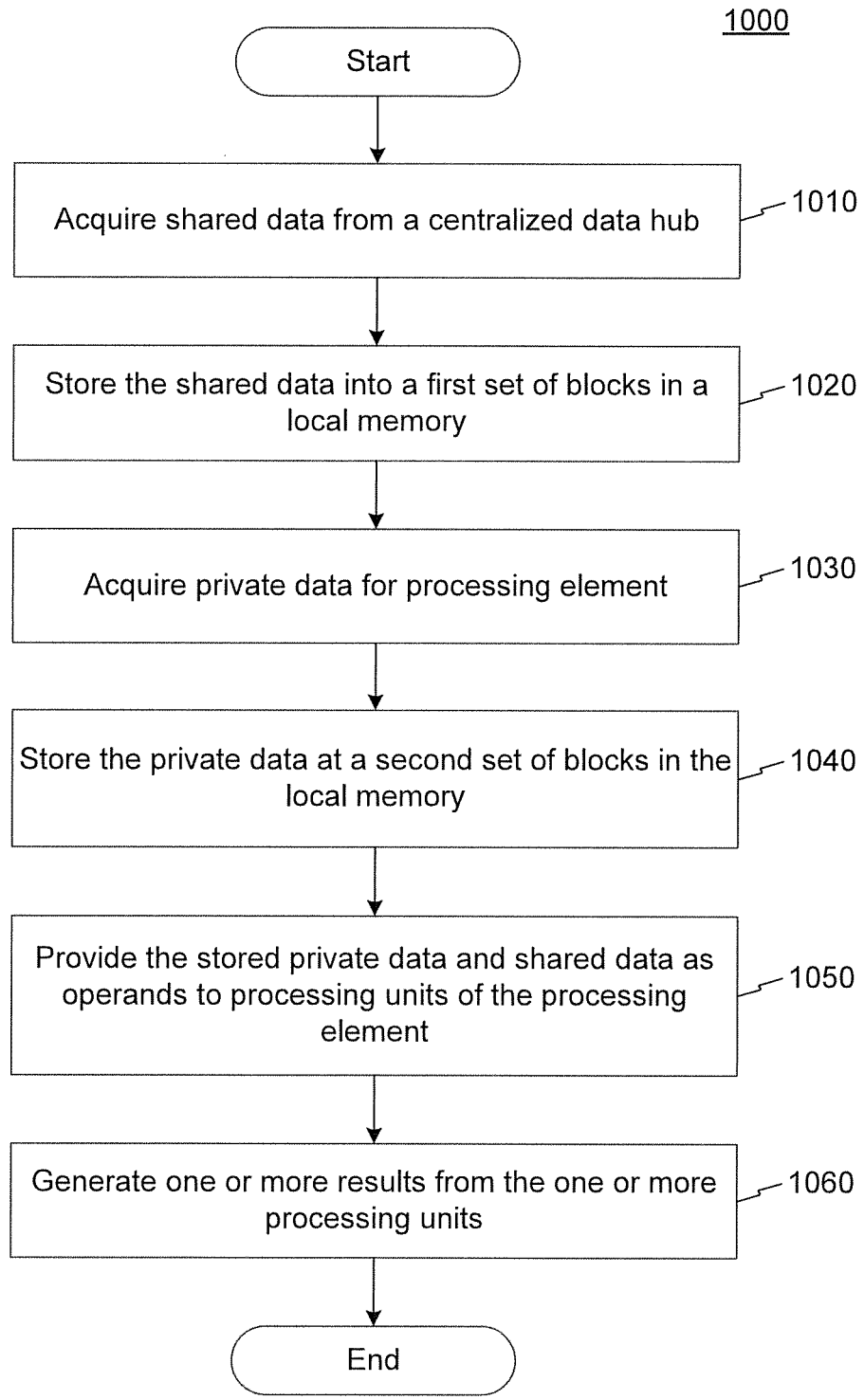
FIG. 10 illustrates a flow diagram of an exemplary method for distributing data to one or more processing units of a processing elements, consistent with embodiments of the present disclosure.

FIG. 10 illustrates a flow diagram of an exemplary method 1000 for distributing data to one or more processing units of a processing elements, consistent with embodiments of the present disclosure. Method 1000 can be performed by a processing element (e.g., processing element 610 of FIGS. 6 and 7).

In step 1010, the processing element acquires shared data from a centralized data hub (e.g., data hub 640). In some embodiments, the acquired shared data can be the data that is distributed in step 930 of FIG. 9. As indicated above, the shared data can be provided to one or more processing units of the processing element or can be provided to a local memory (e.g., local memory 620) of the processing element.

In step 1020, in some embodiments, the processing element stores the shared data into a first set of one or more blocks in a local memory. This step is optional, as shared data can be provided directly to one or more processing units of the processing element, thereby bypassing the local memory of the processing element.

In situations where the shared data is not provided directly to the one or more processing units, the processing element can store the shared data to the local memory. The shared data can be stored into the first set of one or more blocks (e.g., LMn of FIG. 7), which can be partitioned virtually or physically from storage blocks storing private data (e.g., LM0 of FIG. 7). Although the private data and shared data can be stored separately from each other into different blocks, it is appreciated that private data and shared data can be stored together.

In step 1030, the processing element acquires private data. As indicated above, the private data corresponds to data generated locally by the one or more processing units of the processing elements. In step 1040, the processing element stores the private data at a second set of one or more blocks in the local memory (e.g., LM0 of FIG. 7). As stated above, although the private data and shared data can be stored separately from each other into different blocks, it is appreciated that private data and shared data can be stored together. And while steps 1030 and 1040 are shown after steps 1010 and 1020, it is appreciated that steps 1030 and 1040 can also be performed before or in parallel with steps 1010 and 1020.

In step 1050, the processing element provides the stored private data and the shared data as operands to one or more processing units of the processing element (e.g., processing units 630 of FIG. 7). As stated above, the shared data can come from the local memory of the processing element or from the centralized data hub. After receiving the private data and shared data as operands, the processing units can perform operations using the operands, at which point in step 1060, the processing element generates one or more results from the one or more processing units. As stated previously, these operations can be based on one or more of multiplication, addition, multiply-accumulate, multiply-accumulate-reduce, etc. The generated results can be stored as private data in the local memory of the processing element. For example, as shown in FIG. 7, the results from processing units are provided to local memory 620 via the full write port (annotated as the results of processing units being provided to LM.F and multiplexer 730 receiving data from the processing units (PU)). The results can further be stored into a storage block of local memory. For example, the results can be stored in storage block LM0 or another storage block (e.g., such as LM1). After the results are generated, the method can end.

Because of the 2-layer architectural design, the disclosed embodiments provide technical advantages of both centralized and distributed shared memory architectures. At the lower layer, the disclosed embodiments of the memory architecture provide a direct and fast way to share data among the 32 processing units that are associated with the same local memory. At the top layer, on the one hand, the disclosed embodiments of the memory architecture use the idea of distributed shared memory to resolve the scalability issue of centralized memory architecture. The top layer enables the data exchanges between processing units of different local memories. The data hub provides a cost efficient way to quickly exchange data between the 32 distributed shared local memories. These features overcome the issues of conventional distributed shared memory architectures that include the full cross-bar method, along with the performance and complexity issues described above. This layered and nested topology overcomes the shortcomings of slow data access of distributed shared memory architectures, with the balance of reasonable consumption of hardware and resources.

The various example embodiments described herein are described in the general context of method steps or processes, which may be implemented in one aspect by a computer program product, embodied in a computer-readable medium, including computer-executable instructions, such as program code, executed by computers in networked environments. For example, it is appreciated that the instructions may cause the sending of a distribution indication to the centralized data hub, which can distribute shared data according a distribution pattern affiliated with the distribution indication. A computer-readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A processor, comprising:
 a memory architecture having M-number of processing elements each having at least N-number of processing units and a local memory, wherein M, N comprising integers greater than 1 and the memory architecture comprising:
  a first processing element of the M-number of processing elements comprising:
   a first set of N-number of processing units configured to perform a computing operation, and
   a first local memory configured to store data capable of being utilized by the N-number of processing units, wherein first local memory has a full write port, a full read port, a narrow write port, and a narrow read port, wherein the first local memory is configured to acquire private data via the full write port and to send private data via the full read port, and wherein the first local memory is configured to acquire shared data via the narrow write port and send shared data via the narrow read port; and
  a data hub capable of receiving data from the M-number of processing elements and capable of providing shared data from one of the M-number of processing elements to other processing elements of the M-number of processing elements.

2. The processor of claim 1, wherein the first processing element comprises:
 a first multiplexer configured to receive shared data from the data hub and to provide the shared data to the first local memory.

3. The processor of claim 2, wherein the data hub is configured to provide the shared data to a second multiplexer that is configured to provide the share data to one or more of the first set of N-number of processing units.

4. The processor of claim 1, wherein the first local memory further comprises:

a plurality of local memory storage blocks that includes a first set of one or more storage blocks configured to store private data to be utilized by at least one of the first set of N-number of processing units and a second set of one or more storage blocks configured to store shared data received from the data hub.

5. The processor of claim 1, wherein the N-number is identical to the M-number.

6. The processor of claim 1, wherein the data hub is configured to distribute shared data using a distribution pattern.

7. The processor of claim 6, wherein the distribution pattern includes a broadcasting pattern, an XORing pattern, a shifting pattern, or a rotating pattern.

8. The processor of claim 1, wherein the data hub is configured to send shared data to the first of N-number of processing units.

9. A processor, comprising:
a memory architecture having M-number of processing elements each having at least N-number of processing units and a local memory, wherein M, N comprising integers greater than 1 and the memory architecture comprising:
 a first processing element of the M-number of processing elements comprising:
  a first set of N-number of processing units configured to perform a computing operation, and
  a first local memory configured to store data capable of being utilized by the N-number of processing units; and
a data hub capable of receiving data from the M-number of processing elements and capable of providing shared data from one of the M-number of processing elements to other processing elements of the M-number of processing elements,
wherein the first local memory has a full write port, a full read port, a narrow write port, and a narrow read port,
wherein the first local memory comprises a plurality of local memory storage blocks that includes a first set of one or more storage blocks configured to store private data to be utilized by at least one of the first set of N-number of processing units and a second set of one or more storage blocks configured to store shared data received from the data hub, and
wherein the first set of one or more storage blocks are configured to acquire private data via the full write port and to send private data via the full read port and the second set of one or more storage blocks are configured to acquire shared data via the narrow write port and send shared data via the narrow read port.

10. The processor of claim 9, wherein the data hub is configured to receive shared data from the first local memory via the narrow read port.

11. The processor of claim 9, wherein the data hub is configured to send shared data to the first set of one or more storage blocks via the full write port.

12. The processor of claim 9, wherein the data hub is configured to send shared data to the second set of one or more storage blocks via the narrow write port.

13. A method performed by a centralized data hub capable of communicating with M-number of processing elements each having at least N-number of processing units and a local memory, the method comprising:
acquiring data from a processing element of M-number of processing elements;
determining a distribution pattern for the acquired data; and
distributing the acquired data to at least one or more of the M-number of processing elements using the distribution pattern,
wherein the local memory has a full write port, a full read port, a narrow write port, and a narrow read port, wherein the local memory is configured to acquire private data via the full write port and to send private data via the full read port, and wherein the local memory is configured to acquire shared data via the narrow write port and send shared data via the narrow read port.

14. The method of claim 13, wherein the distribution pattern includes a broadcasting pattern, an XORing pattern, a shifting pattern, or a rotating pattern.

15. The method of claim 14, wherein the distribution pattern includes an offset indicating how to distribute acquired data using the distribution pattern.

16. The method of claim 13, wherein determining the distribution pattern comprises:
receiving a distribution indication; and
determining the distribution pattern based on the distribution indication.

17. A method performed by a processing element of multiple processing elements coupled to a centralized data hub, the method comprising:
acquiring shared data from the centralized data hub;
acquiring private data local to the processing element;
storing the private data in a local memory of the processing element, wherein the local memory has a full write port, a full read port, a narrow write port, and a narrow read port, wherein the local memory is configured to acquire private data via the full write port and to send private data via the full read port, and wherein the local memory is configured to acquire shared data via the narrow write port and send shared data via the narrow read port;
providing the shared data and the stored private data as operands to one or more processing units of the processing element; and
generating one or more results from one or more operations performed by corresponding one or more processing units.

18. The method of claim 17, further comprising storing the acquired shared data in the local memory.

19. The method of claim 18, wherein storing the acquired shared data in the local memory comprises storing the shared data in a first set of one or more blocks in the local memory, and
wherein storing the private data in the local memory comprises storing the private data in a second set of one or more blocks in the local memory.

20. The method of claim 17, wherein the acquired shared data is directly provided to the one or more processing units of the processing element without being stored in the local memory.

21. The method of claim 17, wherein the private data that is acquired corresponds to data generated by the one or more processing units of the processing element.

22. The method of claim 17, further comprising storing the generated one or more results in the local memory.

* * * * *